Aug. 23, 1966  H. D. SCHARF  3,267,556
WIRE PROCESSING AND TERMINAL AFFIXING MACHINE
Filed July 29, 1965  10 Sheets-Sheet 1

INVENTOR.
HERBERT D. SCHARF
BY
Caesar, Rivise, Bernstein and Cohen
ATTORNEYS.

Aug. 23, 1966  H. D. SCHARF  3,267,556
WIRE PROCESSING AND TERMINAL AFFIXING MACHINE
Filed July 29, 1965  10 Sheets-Sheet 2

INVENTOR.
HERBERT D. SCHARF
BY
Caesar, Rivise, Bernstein and Cohen
ATTORNEYS.

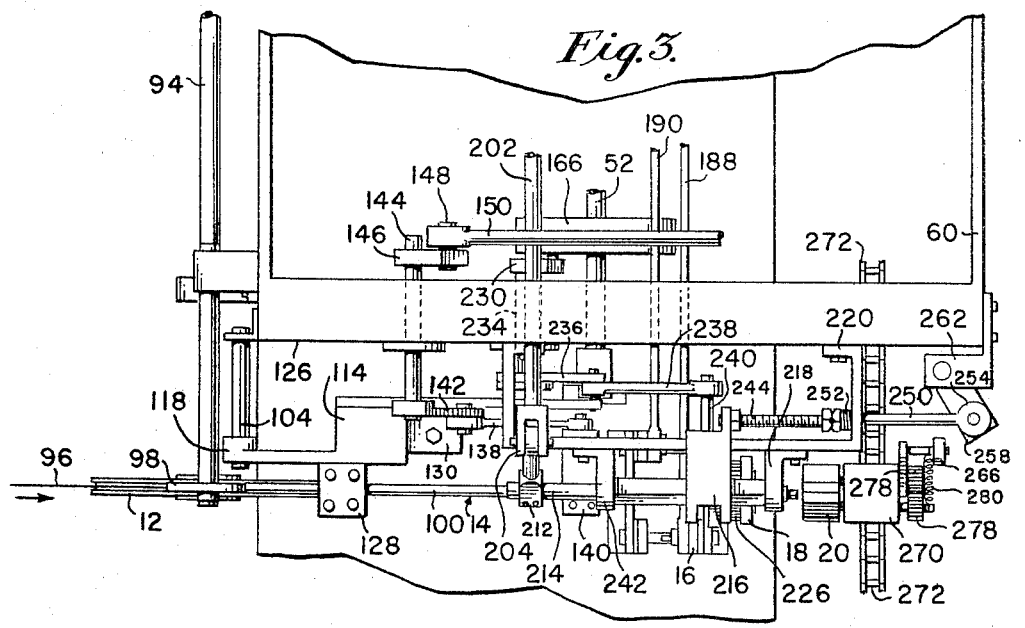
Fig. 3.
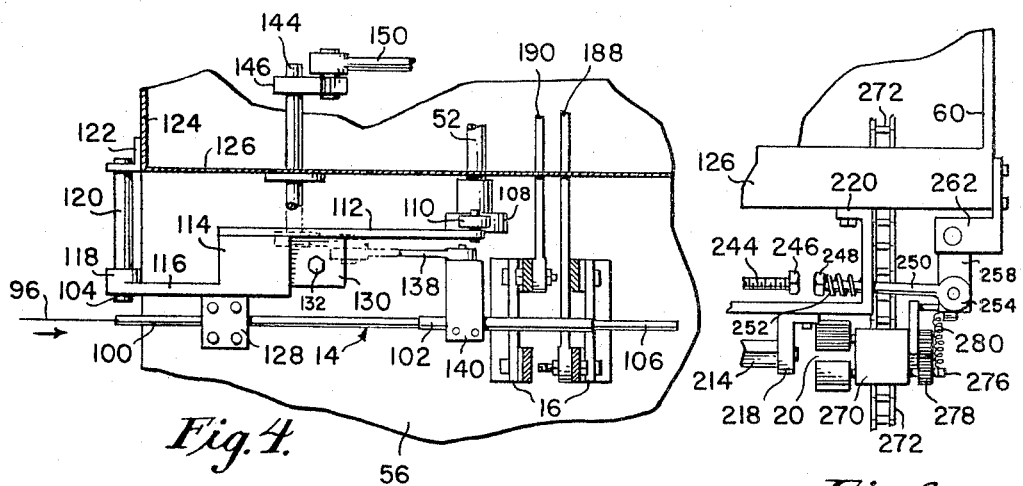
Fig. 4.
Fig. 6.
INVENTOR.
HERBERT D. SCHARF
BY
Caesar, Rivise, Bernstein and Cohen
ATTORNEYS.

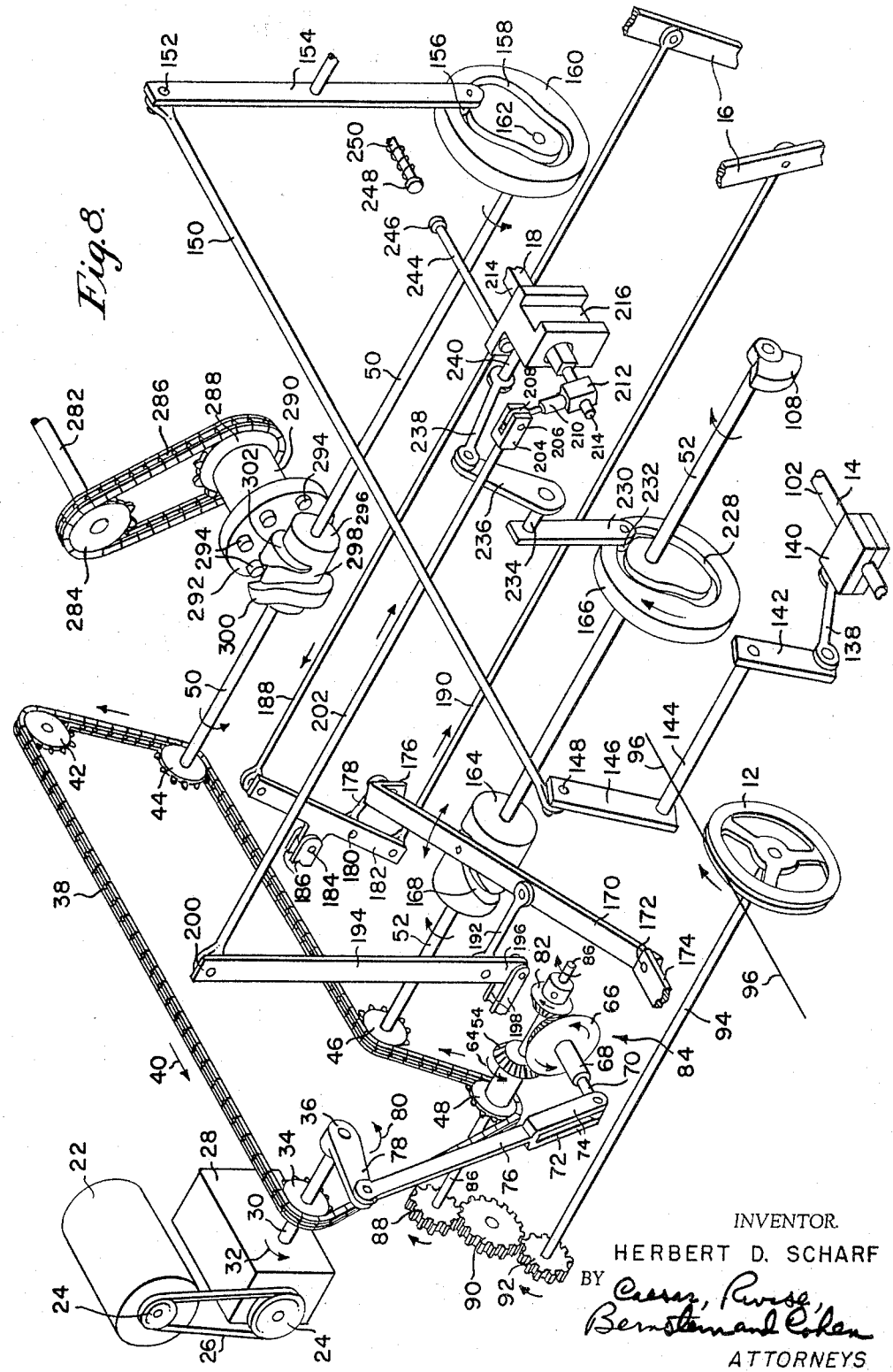

Aug. 23, 1966 H. D. SCHARF 3,267,556
WIRE PROCESSING AND TERMINAL AFFIXING MACHINE
Filed July 29, 1965 10 Sheets-Sheet 5

INVENTOR.
HERBERT D. SCHARF
BY
Caesar, Rivise, Bernstein and Cohen
ATTORNEYS.

INVENTOR.
HERBERT D. SCHARF
BY
Caesar, Rivise, Bernstein and Cohen
ATTORNEYS.

Aug. 23, 1966 H. D. SCHARF 3,267,556
WIRE PROCESSING AND TERMINAL AFFIXING MACHINE
Filed July 29, 1965 10 Sheets-Sheet 7

INVENTOR.
HERBERT D. SCHARF
BY
Caesar, Rivise, Bernstein and Cohen
ATTORNEYS.

Aug. 23, 1966    H. D. SCHARF    3,267,556
WIRE PROCESSING AND TERMINAL AFFIXING MACHINE
Filed July 29, 1965    10 Sheets-Sheet 8

INVENTOR.
HERBERT D. SCHARF
BY
Caesar, Rivise, Bernstein and Cohen
ATTORNEYS.

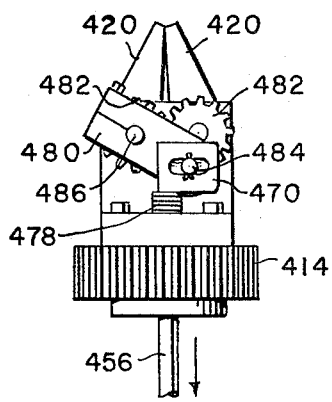
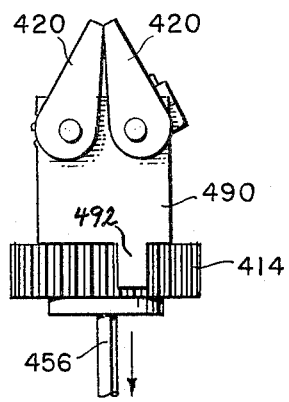
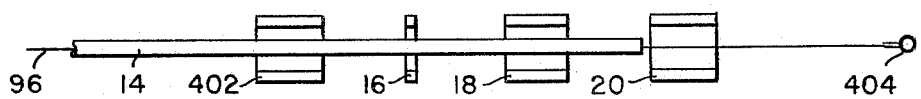
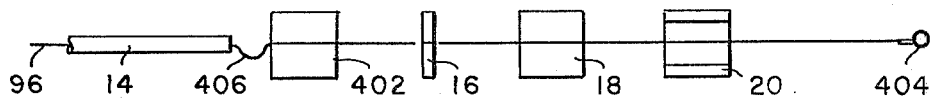
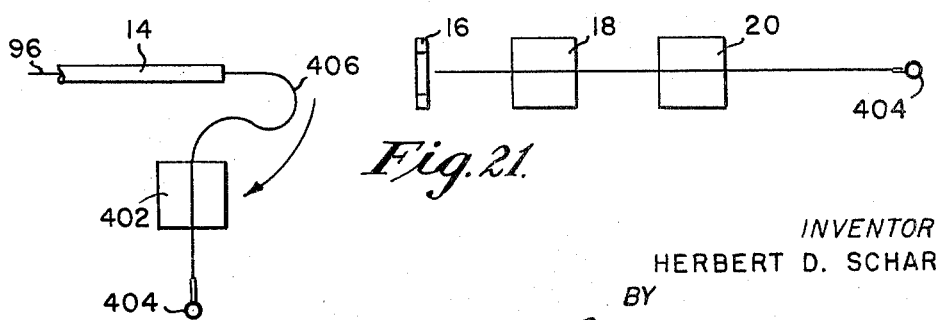

Aug. 23, 1966  H. D. SCHARF  3,267,556
WIRE PROCESSING AND TERMINAL AFFIXING MACHINE
Filed July 29, 1965  10 Sheets-Sheet 10

INVENTOR.
HERBERT D. SCHARF
BY Caesar, Rivise,
Bernstein and Cohen
ATTORNEYS

3,267,556
WIRE PROCESSING AND TERMINAL AFFIXING MACHINE
Herbert D. Scharf, 151 Leverington Ave., Philadelphia, Pa.
Filed July 29, 1965, Ser. No. 475,710
42 Claims. (Cl. 29—155.55)

The application is a continuation-in-part based on co-pending application Serial No. 234,182, filed October 30, 1962, entitled Wire Processing and Terminal Affixing Machine, now abandoned.

The invention relates to a wire processing and terminal affixing machine and more particularly to a machine for cutting predetermined lengths of insulating wire, stripping predetermined lengths of insulation from the ends of the cut wire and thereafter affixing a terminal to one of the cut and stripped ends of the wire.

The present machine is in certain respects an improvement upon a previous wire cutting and stripping machine of the applicant covered by Scharf patent No. 2,756,619, and disclosed and claimed in said Scharf application serial No. 234,182, now abandoned.

The purpose of the present invention is to provide an improved wire cutting and stripping machine which in addition includes the feature of synchronized means to affix a terminal to one or both of the cut and stripped ends of the wire. The present machine is intended to draw insulated wire from a supply reel or the like, automatically cut the same into desired lengths with substantially simultaneous stripping of the insulation from the cut ends of the wire, the machine having a very high output and being adjustable to cut insulated wire over a wide range of lengths wtih the means for affixing the terminal sequentially acting in proper relation to the other elements of the machine.

The present invention is also an improvement in the cutting and stripping aspects over the applicant's prior Patent No. 2,756,619 in that the present machine is somewhat simpler in design and construction and possesses certain improved features including the provision of a novel feeding means which guide the wire being fed into a desirable position and then retracts and drops away to permit the other functions to occur.

Previous machines have cut and stripped insulated wire, and in so doing have utilized a complex and cumbersome wire pulling means to pick up and draw each length of wire to be cut and stripped, this mechanism being time consuming and entailing complexities of operation. In addition, these prior machines were designed to provide lengths of wire which were a multiple of the length of the stroke of the wire pulling means, and thus in this respect lacked a certain amount of flexibility in choice of wire length produced by the machine.

The machine of the present invention, however, comprises a completely coordinated feeding, cutting, stripping and terminal affixing arrangement whereby the insulated wire is fed or pushed forward positively by a power feed mechanism toward the cutting knives; and the cut and stripped sections of the wire are automatically presented in a particularly desirable position so that they may be carried away toward the terminal affixing mechanism of the present invention. This novel and coordinated positive feed mechanism makes possible a heretofore unrealized high output of cut and stripped wires with a terminal affixed to one end thereof. Also, this novel positive feed mechanism is capable of being easily adjusted to feed wires of any desired length ranging from the order of several inches to six feet and more by merely substituting different gears in the feed mechanism.

The present invention also provides a novel coordinated mechanism which is arranged to cut and strip the insulated wire on the basis of differential movements in the wire feed and other cutting and stripping mechanisms, as controlled by a trunnion mechanism and several cam-type mechanisms. The wire is fed to a set of cutting and stripping knives which are actuated to sever the insulated wire as well as to cut the insulation only to a desired length from the point of severance, after which the wires on either side of the sets of knives are given a suitable motion to draw the cut insulation from the ends of the wire.

It will be understood herein that the wire still connected to the feed wheel and passing through the other feed mechanisms will be known as the upstream wire, while the portion of the wire that has been cut by the cutting mechanism and which is ejected therefrom will be known as the downstream wire. It follows that the upstream wire has temporarily but one end, namely, the downstream end, whereas the downstream wire has both an upstream end and a downstream end.

Immediately after the knives have been actuated to sever the wire and to cut the insulation, the knives are maintained in their closed position for a short duration of time during which the motion of the upstream wire is actually reversed or retracted by virtue of a reversal of the feeding wheel in order to draw off the insulation from the end of the upstream wire against the resistance of the upstream stripping knives. At substantially the same time, the downstream wire is moved away from the closed downstream stripping knives by stripper gripper means to draw off the insulation from the end of the downstream wire. After the stripper gripper has moved and after the feeding wheel has reversed in order to complete the stripping action, a conveyor gripper is actuated to move the cut and stripped piece of wire toward the terminal affixing means. Thereafter, a new portion of wire to be cut and stripped is fed toward a position so that it eventually can be acted upon in the next cycle by the cutting and stripping knives.

Another feature of this invention is a trunnion mechanism which operates upon a counter-rotating shaft whereby intermittent stopping and actual reversal of the shaft associated with the feeding wheel is accomplished for a short distance in order to perform stripping of the upstream wire.

A further feature of the invention is the provision of coordinated cutting and stripping knives including means on the knives to align the wire properly between them, and to prevent the knicking or cutting of the conductor of the wire by the two pairs of stripping knives. Further retaining means are also provided to virtually enclose the wire between the knives after it is fed between the cutting and stripping knives.

The foregoing as well as other objects of the invention are achieved by providing a mechanism which includes a reversible feed wheel which operates to feed wire to be processed through a telescoping, reciprocal guide tube. Cutting and stripping knives are provided at an intermediate point in order to sequentially cut and strip the wire being processed. A stripper gripper is provided to carry away for stripping purposes the upstream end of the downstream wire. As previously noted the downstream end of the upstream wire is retracted by way of a reversal of the feed wheel. A conveyor gripper is provided to carry away a piece of cut and completely stripped downstream wire toward a station for purposes of affixing a terminal to one of the cut and stripped ends.

The machine of the present invention operates in accordance with the following cycle:

(1) The feed wheel pushes wire to be processed through a guide tube which has already been elevated and extended.

(2) As wire is being pushed through the guide tube, the guide tube drops down at a predetermined time immediately behind the conveyor gripper which is at that time in open position.

(3) The guide tube retracts and the wire, which is still feeding, is laid into and passes through the conveyor gripper.

(4) The guide tube retracts back beyond the cutting and stripping zone and the feed wheel begins to slow down.

(5) The cutting and stripping knives start to close and the stripper gripper simultaneously begins to close about a downstream portion of the wire as the motion of the wire is substantially stationary.

(6) The cutting and stripping knives have fully closed, the downstream wire is fully gripped by the stripper gripper and the feed wheel has stopped.

(7) The feed wheel reverses to strip the downstream end of the upstream wire and simultaneously the stripper gripper advances to strip the upstream end of the downstream wire.

(8) Near the end of the advance of the stripper gripper it trips a spring loaded link which closes the conveyor gripper.

(9) As the conveyor gripper closes the stripper gripper opens and the following happens:

(a) The conveyor on which the conveyor gripper is located moves a fixed distance to carry the processed wire toward a terminal affixing station.

(b) The guide tube is now elevated and extended, the guide tube passing over the cutting and stripping knives before they open.

(c) The cutting and stripping knives then start to open.

(d) The feed wheel begins to feed wire forwardly through the guide tube.

(e) The opened stripper gripper begins to return to its initial rearward position.

In another embodiment of the invention a feeder gripper is provided upstream of the cutting and stripping knives. With this embodiment of the invention a terminal will be secured to both stripped ends of the length of wire.

The wire is still being fed forwardly at a decelerating rate when the stripper gripper and feeder gripper simultaneously close upon it. With the wire still being fed slowly forwardly, the stripper gripper advances and the feeder gripper retracts simultaneously. In this way, the upstream end of the downstream wire and the downstream end of the upstream wire are simultaneously stripped.

The feeder gripper now pivots after completion of the linear stripping action in order to present the bared downstream end of the upstream wire to a terminal affixing station. The wire feed is now reversed and so any loop of wire built up after the closing of the feeder gripper tends to be minimized.

As soon as a terminal has been affixed to the downstream end of the upstream wire, the feeder gripper opens and pivots to its original position as the guide tube becomes elevated and extended in order to repeat the cycle.

Other objects and many of the attendant advantages of this invention will be readily appreciated as the same becomes better understood by reference to the following detailed description when considered in connection with the accompanying drawings wherein:

FIG. 3 is a plan view of the device of FIG. 2 taken generally along the lines 3—3 of FIG. 2 but showing the stripper gripper in an advanced position with the conveyor gripper in a closed position.

FIG. 4 is a sectional view taken along the lines 4—4 of FIG. 2;

FIG. 6 is a fragmentary detail view of some of the parts in FIG. 3 wherein the stripper gripper is retracted and the conveyor gripper is open;

FIG. 8 is an enlarged perspective view of the various mechanism which motivate the operative elements of the present invention;

FIGS. 17 and 18 are views similar to FIGS. 14 and 15, but with the feeder gripper fingers closed;

FIGS. 19, 20 and 21 are schematic views showing the portion of the second embodiment of the present invention.

Referring now in greater detail to the various figures of the drawings wherein similar reference characters refer to similar parts, the machine constituting a first embodiment of the present invention is generally illustrated at 10 in FIG. 1.

Figure 7:
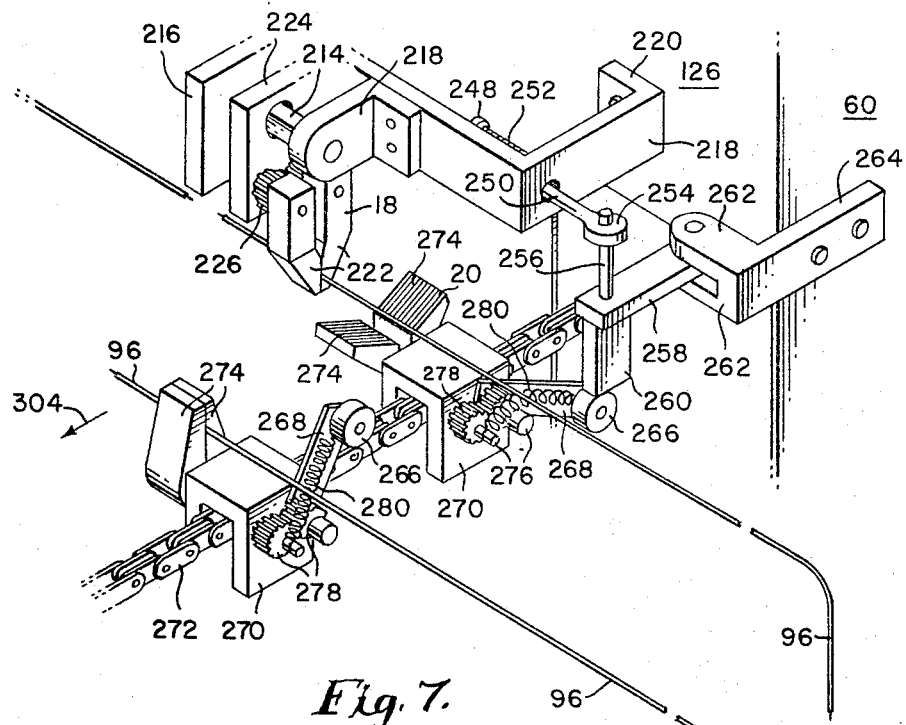
FIG. 7 is a fragmentary perspective view showing a portion of the front of the machine including the relationship between the stripper gripper and the conveyor gripper.

As will become more readily apparent hereinafter, the basic parts of the present machine include a feed wheel 12, a guide tube assembly 14, cutting and stripping knives 16 (FIG. 3) supported on standards 17, standards 17, stripper gripper 18 and conveyor 20.

Operative power for the machine is provided by an electric motor 22 (FIG. 8) which is connected by way of pulleys 24 and belt 26 associated therewith to a gear reducer assembly in gear box 28. This in turn operates the drive shaft 30 at a constant speed in a given direction, such as, in a counterclockwise sense as illustrated by the arrow 32.

Rotation of the main drive shaft 30 in turn directly causes rotation of a driving sprocket 34, and a trunnion crank arm 36 which is secured at the outer end of the main drive shaft 30.

A link chain 38 passes about the driving sprocket 34 and is accordingly driven thereby in the direction of arrow 40. The linear motion imparted to the link chain 38 is used to drive driven sprockets 42 (idler) 44, 46 and 48 as illustrated in FIG. 8.

A first shaft 50 is pinned to the driven sprocket 44 and rotates therewith. A second shaft 52 is pinned to the drive sprocket 46 and rotates therewith. The rotation of the sprocket 48 in turn causes a rotation of a first bevel gear 54 which is actually integral with the sprocket 48.

Figure 1:
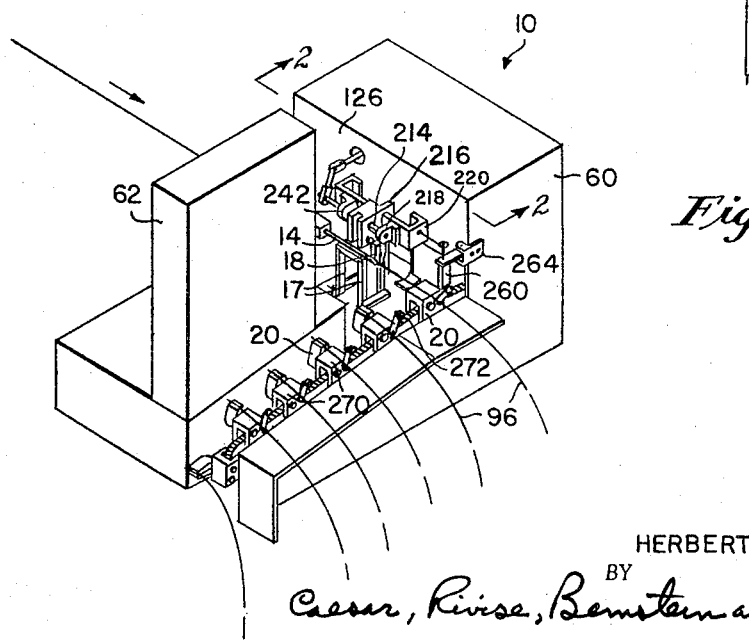
FIG. 1 is a general perspective view of a machine constituting an embodiment of the present invention, taken generally from the front thereof.
Figure 2:
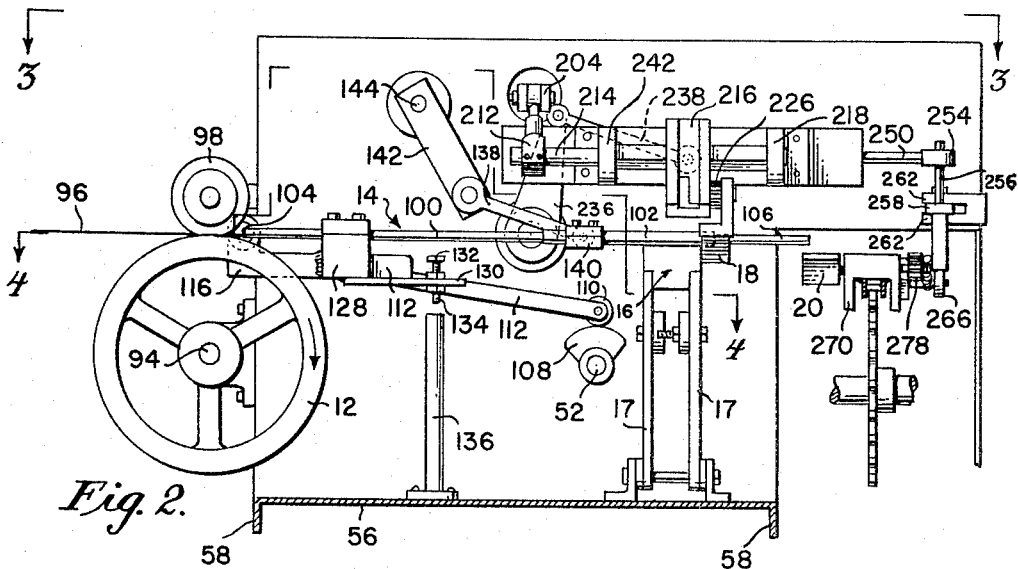
FIG. 2 is an enlarged sectional view taken along the lines 2—2 of FIG. 1.
Figure 5:
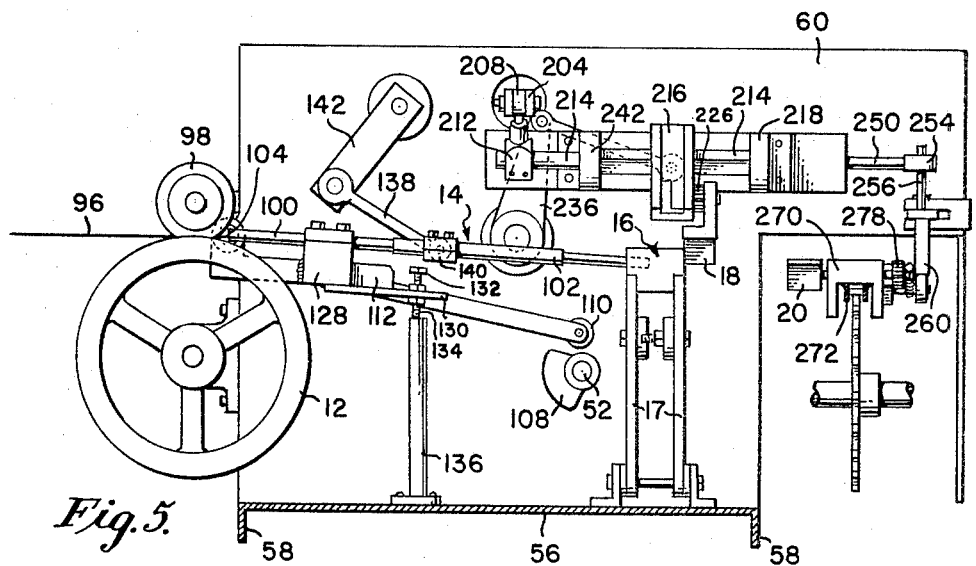
FIG. 5 is a view similar to FIG. 2, but in FIG. 5 the stripper gripper is about to grip the wire prior to the stripping step.

Referring to FIGS. 2 and 5, it is seen that much of the components of the present invention are mounted upon a base 56 with integral legs 58 depending therefrom and making actual contact with the floor. In addition, as noted in FIG. 1, a considerable portion of the gearing, drive mechanism, etc. of the present invention, which is illustrated in FIG. 8, is situated in a gear housing 60. The terminal applying mechanism of the present invention is situated in a housing 62. As further illustrated in FIG. 1, a considerable portion of the feeding cutting and gripping mechanism of the present invention is secured outwardly of the housing 60 and utilizes a wall thereof in order to obtain the necessary support.

Referring now to FIG. 8, the feed wheel 12 and the various elements associated therewith will now be described.

As previously noted, the linear movement of the link chain 38 drives a sprocket 48. As previously noted, the first bevel gear 54 is integral with the driven sprocket 48 and thus rotates therewith in the counterclockwise direction of arrow 64. This counterclockwise rotation of the first bevel gear 54 in turn initiates a counterclockwise rotation of the differential idler gear 66. A collar 68 is integral with the differential gear 66 and accordingly rotates therewith. A short shaft 70 passes through the collar 68 and is so secured within a complementary opening through gear 66 that it does not interfere with the rotation of the collar 68. The short shaft 70 is pinned to a yoke 72 which has arms 74 merging upwardly into a lever 76 which has an upper end pivotally secured to one end of a crank arm 78. As the main drive shaft 30 rotates in the counterclockwise direction of arrow 32, the crank arm 78 in turn is rotated in a counterclockwise direction. This in turn carries the upper end of lever 76 in a circular pattern about the axis of shaft 30. By virtue of the foregoing action the short shaft 70 and in turn the differential idler gear 66 is caused to rock or undergo an oscillating motion. This motion and the mechanism causing it are discussed and shown in considerable detail in Scharf Patent No. 2,756,619. In this connection, the combination of the differential gear 66 with the first bevel gear 54 (which drives the idler gear 66) and a second bevel gear 82 which is in turn driven by the bevel gear 66 with the various shafts and other mechanism, some of which have already been described, is to be hereinafter identified as the trunnion assembly 84.

The second bevel gear 82 is pinned to a gear shaft 86 which passes through the first bevel gear 54 without in any way interfering with it. The shaft 86 has secured thereto at the far end thereof a first feed wheel gear 88.

It is thus seen from the foregoing that rotation of the sprocket 48 initiates rotation of a first bevel gear 54. This in turn causes a rotation of gear 66 which in turn initiates a rotation of a second bevel gear 82. It is to be pointed out that the second bevel gear 82 will therefore almost always rotate in a sense opposite to that of the first bevel gear 54.

As the second bevel gear 82 is pinned to a gear shaft 86 which does not in any way affect the first bevel gear 54, the net result from the foregoing mechanism is that the shaft 86 is driven in a sense opposite to the sprocket 48 with the rotation of the shaft 86 capable of being altered, namely, slowed down and eventually even reversed for a short time, virtue of the oscillating motion imparted to the differential idler gear 66 by virtue of the action of the crank arm 78.

It is the reversal of the rotation of the gear shaft 86 which in turn causes a reversal of the rotation of the feed wheel 12 for purposes of stripping the downstream end of the upstream wire as will be discussed in considerable detail hereinafter.

When the trunnion assembly 84 moves in the same sense as the sprocket 48, there is less relative movement between the gears 54 and 66 than when the gear 66 is stationary, and hence the radian motion of the trunnion is subtracted from the motion of the sprocket. Thus, when the radian motion of the trunion assembly 84 during a portion of its oscillation cycle is equal in both magnitude and sense to the radian motion of the sprocket 48 per unit of time, the resultant radian motion of the shaft 86 will be substantially zero. This is because there is no relative motion between the gears 54 and 66 and hence the gear 54 cannot drive the gear 66. As the radian motion of the trunnion assembly 84 exceeds the radian motion of the sprocket 48, the shaft 86 actually reverses its rotation.

Alternately, when the trunnion assembly moves in a direction opposite to that of the sprocket 48, the motion of the trunnion assembly is added to that of sprocket 48 and thus the rotation of the shaft 86 is thereby accelerated during that particular portion of the cycle of the trunnion assembly 84.

As further illustrated in FIG. 8, the shaft 86 has pinned at the far end thereof a first feed wheel gear 88. The gear 88 meshes with a second feed wheel gear 90 which in turn meshes with a third feed wheel gear 92. A feed wheel shaft 94 is secured to the gear 92 with the feed wheel 12 being secured to the other end of the feed wheel shaft 94. Thus, rotation of the shaft 86 is in turn transmitted by a feed wheel shaft 94 to the feed wheel 12. Hence, a reversal of the shaft 86, in turn causes a reversal of the rotation of the feed wheel 12. It is to be further noted that idler wheel 98 is associated with feed wheel 12.

Insulated wire 96 is led to the feed wheel from a tension pulley assembly (not illustrated). The insulated wire 96 is wrapped at least once about the periphery of the feed wheel 12 and is then led forwardly to the other elements, such as, the cutting and stripping elements of the present invention. The tension pulley assembly basically comprises two vertically spaced rows of pulleys with the wire 96 being led alternately about a pulley of an upper row and then about a pulley of a lower row. The various upper and lower pulleys are tension mounted with respect to each other by virtue of spring arrangements in order that the feed wheel 12 will be able to push the wire into the machine, rather than pull it as has been done in many prior cutting and stripping machines. By virtue of a pushing mechanism, wire lengths of essentially any desired minimum of, for instance, one foot may be provided. In addition, the wire lengths of the present machine need not be of a multiple of the length of a stroke as was the case in the pulling stroke mechanisms of many prior machines.

The guide assembly 14 will now be discussed in connection with certain other features of the invention.

The guide assembly 14 is most clearly shown in FIGS. 2, 5 and 8 of the drawings and basically comprises a rear stationary tube 100 and a forward movable tube 102 telescoped over the forward end of the tube 100. As demonstrated by a comparison between FIGS. 2 and 5, the movable tube 102 slides relative to the stationary tube 100. In addition, both of the tubes 100 and 102, when collectively taken together as a unit are pivotally secured to the machine housing at point 104 thereby enabling the tubes to drop to the position of FIG. 5. Also, in this manner the guide tubes 100 and 102 may be elevated to the height of FIG. 2. In so doing, the movable tube 102 is reciprocated or slid forwardly with respect to the stationary tube 100.

The various mechanism necessary to achieve the foregoing action will now be described.

First, it is to be noted that in the applicant's prior Patent No. 2,756,619, the guide tube was entirely stationary whereas with the present invention the guide tube is caused both to be elevated and extended. Thereafter, wire to be processed is pushed by means of feeding wheel 12 through the guide tubes with the extended movable guide tube 102 functioning to precisely place the moving wire in a given position upon a conveyor gripper 20 in order that the wire 96 may be eventually grabbed by the conveyor gripper 20 in the desired placement. Thus, when the particular piece of wire is brought to the terminal affixing station, the terminal will be in turn secured to the bared end of the wire with a sufficient degree of precision. As is apparent from FIGS. 2 and 5, the movable tube 102 includes a forward extension 106 secured thereto which is of a smaller internal diameter than that of the movable tube 102 and which has a diameter which may be of a somewhat smaller diameter than the stationary tube 100.

The raising and lowering of the guide tube assembly 14 is controlled by means of a sector cam 108. As best illustrated in FIG. 8, the sector cam 108 is secured adjacent the end of second shaft 52. As the sector cam extends for a radian area of approximately 90°, it is seen that the cam 108 is effective for about ¼ of its cycle of revolution. As is clearly illustrated in FIGS. 2 and 5, the sector cam 108 is adapted to be operative against a roller or cam follower 110 which is secured at one end of a rigid arm 112 which extends backwardly as illustrated in FIG. 4 to be rigidly secured to an L-shaped section 114 (FIG. 3) having a rearwardly extending arm 116 (FIG. 4) which terminates in a collar 118 adapted to pivotally receive an elongated pin 120 which has its other end journaled in angle piece 122 which is fixedly secured to a wall 124 of gear housing 60. Perpendicular wall 126 of the gear housing 60 is also shown in FIG. 4. It is thus seen that the pivoting of the collar 118 with respect to the pin 120 is in reality the pivot point 104. Secured to the outer side of the arm 116 is a carriage 128 (FIGS. 2 and 5) through which the stationary tube 100 is secured.

As best illustrated in FIGS. 2, 3 and 5, a horizontal levelling plate 130 extends forwardly from the L-shaped section 114. As noted in FIGS. 2 and 5, an adjustable bolt 132 with threaded stem 135 passes through the plate 130. As best shown in FIG. 5, the stem 134 will rest against a pedestal 136 secured to the base 56. It is thus seen that the combination of the stem 134 and the pedestal 136 limits the combination of the stem 134 and the pedestal 136 limits the lowering of the horizontal plate 130 and that this in turn limits the lowering of the entire guide tube assembly. In FIG. 2, the sector gear 108 has contacted the roller 110 to raise the stem 134 upwardly so that in this particular portion of the machine's cycle, the pedestal 136 does not exert any effect. It is only when the sector gear 108 no longer contacts the roller 100 that the pedestal 136 serves to limit the descent of the stem 134.

The movable tube 102 is reciprocated or slid with respect to the rear stationary tube 100 by means of a crank rod 138 secured to a reciprocating carriage 140 as illustrated in FIGS. 2, 4, 5 and 8.

The crank rod 138 is pivotally secured to a connecting link 142 which turns in a generally vertical plane. The connecting arm 142 is in turn rigidly secured for rotation to a horizontal rod 144 which is secured to a second vertical connecting arm 146. The second connecting arm 146 is pivotally secured at 148 to an elongated rod 150 which extends for a considerable distance forwardly to a point 152 of pivotable securement to a vertical arm 154 having a roller or cam follower 156 secured at its lower end. The cam follower 156 is positioned within cam pattern 158 of a first disc cam 160 which is eccentrically secured to shaft 50 at 162.

It is thus seen that the first disc cam 160 rotates in an eccentric manner as modified by the somewhat irregular cam pattern 158 in order to exert a reciprocating and a rising or dropping action upon the rod 150 which is in turn communicated through the arms 142 and 146 to the carriage 140 in order to reciprocate the forward movable tube 102 of the guide tube assembly.

It is thus seen that rotation of the shaft 50 is utilized to bring about a reciprocation of the movable tube 102 upon the stationary tube 100 of the guide tube assembly.

As illustrated in FIGS. 2 and 5, the forward reciprocation or extension of the movable tube 102 occurs at a time when the guide tube assembly 14 is elevated by means of the interaction of the sector cam 108 upon the roller 110. In this manner the guide tube assembly is both elevated and extended. At the next point in the cycle, the sector cam 108 has passed beyond the roller 110 and thus the guide tube assembly drops down to the extent permitted by the pedestal 136, although the guide tube assembly is still extended. At a still later point in the cycle, the now lowered guide tube assembly is retracted, then again raised by the action of sector cam 108 and finally extended by the reciprocatory action of the rod 150 as communicated to the movable carriage 140.

The interaction of the foregoing elements with the cutting and stripping knives 16 and the stripper gripper 18 will now be discussed.

The guide tube assembly 14 has now been elevated and extended, the insulated wire 96 pushed through the guide tube assembly by virtue of the forward action of the feed wheel 12 and the guide tube assembly has dropped down adjacent the conveyor gripper 20. The guide tube has thereafter retracted with insulated wire still being pushed through the now retracted guide tube with the insulated wire passing between the open halves of the conveyor gripper 20. The movable tube 102 of the guide tube assembly then retracts behind the cutting and stripping zone 16. At this stage of the cycle the trunnion assembly 84 is already exerting an action to slow down and eventually reverse the rotation of the feed wheel 12. As the pushing of the wire 96 through the guide tubes is about to stop, it is essential for the cutting and stripping knives 16 to begin to close with the stripper gripper 18 simultaneously about to grasp the upstream end of the downstream wire. As the cutting and stripping knives 16 close and the wire 96 is fully gripped by the stripper gripper 18, the feed wheel 12 reverses simultaneously as the stripper gripper 18 advances. In this manner the reversal of the feeding wheel 12 has led to stripping of the end of an upstream piece of wire, and the advance of the stripper gripper 18 has stripped the upstream end of a piece of downstream piece of wire whose forward end was previously cut and stripped.

All of the foregoing interaction of the cutting and srtipping knives 16 and the stripper gripper 18 and the interaction of certain of the various elements related thereto is brought about by the rotation of shaft 52. As illustrated in FIG. 8, a first barrel cam 164 is secured to the shaft 52 and rotates therewith. In addition, the second disc cam 166 is secured in a similar manner to the shaft 52 for rotation therewith. The barrel cam 164 has a sinuous cam pattern 168 which by virtue of the rotation of the barrel cam 164 controls the pivoting of a lever 170 about one end thereof at 172 to a support 174. As the barrel cam 164 rotates, the lever 170 is alternately caused to pivot about its end in pivotal securement 172 to support 174..

It is to be noted that the other end of the lever 170 is best bent down in a tab 176 which has a short connecting rod 178 secured to the tab 176. The other end of the rod 178 is secured at 180 to a finger 182 which is pivotally secured at 184 to ears 186 which are fixed to a support (not shown). It is to be noted that point 184 is above point 180.

Secured at each end of the finger 182 are long connecting rods 188 and 190 which are directly connected to the cutting and stripping knives 16.

In this connection attention is referred to the applicant's prior Patent No. 2,756,619 for a full dimension of the precise construction of the cutting and stripping knives. In addition, the structure of equivalent cutting and stripping knives has been long known in the art and thus constitutes no part of the present invention except as in the general combination thereof.

It is thus seen that rotation of the shaft 52 causes the lever 170 to alternately pivot about one of its ends. In this way one of the long connecting rods 188 or 190 is drawn in one direction while the other of the connecting rods is simultaneously drawn in the other direction by virtue of the pivotable securement at 180 of the lever 170 which is spaced from the pivotable securement 184 of the finger 182.

Furthermore, a second connecting rod 192 is secured to the lever 170 as illustrated in FIG. 8. The other end of the connecting rod 192 is secured to a second finger 194 having its lower end pivotally secured in second ears 198. The upper end 200 of the second finger 194 has a stripper gripper opening and closing rod 202 pivotally secured thereto.

The other end of the rod 202 has a clamp 204 fitted thereto which includes a pair of ears which pivotally engage at 206 an eyelet 208 including a shank which widens into a rigid collar 210. The collar 210 widens into a block 212 having a rod assembly 214 secured therein which extends forwardly through stripper gripper carriage 216 and finally is adapted to revolvingly interfit through angle piece 218 (FIG. 7) secured to bracket 220 which is in turn secured to gear housing 60.

It is to be noted that the stripper gripper 18, as best illustrated in FIG. 7, comprises two fingers 222 which are pivotally secured to front ledge 224 of the stripper gripper carriage 216. Each of the fingers 222 may be actuated by means of a pair of spur gears 226 each interposed between a finger 222 and the front ledge 224. Each shaft passing through a finger 222 and a gear 226 extends through the ledge 224 and has another spur gear (not shown) secured thereon (immediately behind ledge 224). The rod assembly 214 has a spur gear secured thereon which meshes with each of the last-named spur gears.

Thus, when the rod assembly 214 is turned in accordance with the movement of the opening and closing rod 202, the spur gear associated with the rod assembly 214 will cause the last-named spur gears to turn to bring the fingers 222 together thereby closing the stripper gripper. As soon as the rod 202 is urged in an opposite direction by virtue of the movement of lever 170, as influenced by barrel cam 164, the gear associated with the rod assembly 214 is moved in an opposite sense thereby opening the fingers 222. Furthermore, a spring may be associated with the fingers 222 to hold them in a normally closed position to facilitate gripping.

As will be described in detail hereinafter, it is necessary that the stripper gripper 18 be moved forwardly of the cutting and stripping zone in order to strip the upstream end of a downstream piece of insulated wire.

The reciprocation of the stripper gripper 18 is obtained by virtue of the action of second disc cam 166 which is rotated somewhat eccentrically by the shaft 52.

As shown in FIG. 8, a cam pattern 228 similar to cam pattern 158 is formed in one of the circular surfaces of the disc cam 166. A lever 230 having a roller 232 secured to its lower end and movable in the cam pattern 228 is provided. A horizontal rod 234 is secured adjacent the forward end of the lever 230 with the other end of the rod 234 being secured to an inclined arm 236. A first link 238 is secured between the end of the arm 236 and a horizontal link 240 which secures the link 238 to the stripper gripper carriage 216.

As previously noted, a bracket 220 is provided which includes an angle piece 218 (FIG. 3) and an angle piece 242, each of which are secured to the wall 126 of the gear housing. As illustrated in FIGS. 3 and 7, the reciprocation of the stripper gripper 18 is guided and controlled by virtue of the rod assembly 214 passing through the stripper gripper carriage 216. Thus, the rod assembly 214 functions as a track over which the stripper gripper carriage 216 is telescoped. Thus, when the rotation of the disc cam 166 reciprocates the carriage 216, such reciprocation is in a linear sense.

The precise cycle of the stripper gripper involves a gripping of the upstream end of a downstream piece of wire after it has been cut, the forward reciprocation being permitted in accordance with cam pattern 228. The opening of the stripper gripper 18 occurs under the action of first barrel cam 164 as transmitted through lever 170 to rod 202 and then to rod assembly 214 to act upon the fingers 222 of the stripper gripper which are thereby opened by the rotation of rod assembly 214. Thus, the advance of the stripper gripper forwardly, followed by the opening of the stripper gripper accomplishes the stripping and the delivery of the cut and stripped upstream end of a piece of downstream wire into the conveyor gripper 20. The stripper gripper is then reciprocated rearwardly with the fingers 222 thereof remaining open. In recapitulation, the rotation of the shaft 52 actuates:

(a) The cutting and stripping knives.
(b) The reciprocation and opening of the stripper gripper 18, and
(c) The elevation of the guide tube assembly 14.

It is to be noted that when the stripper gripper 18 opens, the wire length which it is holding will have already dropped down into the now closed conveyor gripper 20. It is therefore essential that the conveyor gripper 20 should close immediately after the stripper gripper 18 has opened in order that the wire 96 may be firmly grasped by the conveyor gripper 20 and thus carried away toward the terminal affixing portion of the machine.

For this purpose there is secured to the stripper gripper carriage 216 an actuator rod 244 having a contact button 246 which is adapted to be urged against a contact button 248 at the end of a slidable rod 250 (FIG. 6) which has a short coil spring 252 interposed between the contact button 248 and the inner surfaces of the angle piece 218. The spring 252 serves to limit the distance which the rod 244 may urge the rod 250 and also permits the rod 250 to return to its initial position as soon as the rod 244 has been retracted or carried away by the carriage 216.

The rod 250 has a collar 254 at one end thereof which secures the vertical pin 256 (FIG. 7) which in turn is secured to a plate 258 and an integral cam 260. The plate 258 is pivotally secured between ears 262 extending from arm 264 which is secured to gear housing 60. As noted in FIG. 7, the cam 260 serves to restrain roller 266 in a depressed position until a desired time. The roller 266 is secured at one end to a lever 268, the other end of which is pivotally secured to a conveyor gripper carriage 270 which is motivated by the link chain 272. As illustrated in FIG. 7, the conveyor gripper 20 is comprised of two fingers 274, each having a rod 276 secured thereto. As noted in FIG. 7, the rods 276 pass through the U-shaped conveyor gripper carriage 270. Each of the rods 276 has a spur gear 278 secured at an end thereof in order that the fingers of the conveyor gripper may be opened at a later time during the terminal affixing steps. A spring 280 has one end secured to a rod 276 with the spring then passing over the other rod 276 (in one position of lever 268) and then being affixed to the other end of lever 268 adjacent the roller 266. It is thus seen from FIG. 7 that if the cam 268 be removed from the roller 266, that the lever 268 will immediately snap in a counterclockwise direction so that the roller 266 is raised to an elevated position as illustrated adjacent a downstream conveyor gripper carriage 270.

Thus, the net effect of forcing a slidable rod 250 outwardly under the urging of the actuator 244 is to pivot the plate 258 so that the cam 260 no longer contacts the roller 266, thereby permitting the lever 268 to pivot in a counterclockwise direction. As the lever 268 pivots upwardly, it forces the spur gears 278 to revolve since the lever 268 is secured to one of the rods 276. This causes the fingers 274 of the conveyor gripper 20 to close and to be held closed as illustrated at the downstream station in FIG. 7. In this connection it is to be noted that the actuating of the rod 250 is timed to occur as the rod assembly 214 is about to urge the stripper gripper 18 to open. As the stripper gripper opens the roller 266 is released to close the conveyor gripper.

As indicated in FIG. 7, the link chain 272 which moves the conveyor grippers 20 is actuated by rotation of a shaft 282 which has its opposite end secured to a sprocket which is driven by another link chain 286. As noted in FIG. 8, the link chain 286 passes about the upper sprocket 284 and is also threaded about the lower sprocket 288. A short stub 290 is secured to the lower sprocket 288 and a cam plate 292 is secured at the other end of the short stub 290 to revolve therewith. The cam plate 292 has six rollers 294 revolvingly secured thereto and spaced generally 60° apart. The roller 292 are adapted to be sequentially engaged by a barrel cam 296 with cam track 298, the barrel cam 296 being secured to rotate with the shaft 50. It is to be noted that the cam track 298 lies between cam ridges 300 and 302. Hence, with each full rotation of the shaft 50 one of the rollers 294 is engaged in the cam track 298 and is revolved until the next roller 294 is about to be engaged in the cam track 298. Thus, the cam plate 292 revolves for 60° with each full rotation of the shaft 50. Such partial rotation is directly transmitted by the short stub 290 to the link chain 286 and finally to the shaft 282. As previously noted, the link chain 272 which moves in conveyor grippers 20 is associated with the other end of the shaft 282 and hence the intermittent movement of the link chain 286 directly causes the intermittent movement of the link chain 272 to carry conveyor grippers 20 toward the terminal affixing station. Thus, the conveyor grippers are intermittently moved in the direction of arrow 304 toward the terminal applying housing 62. This housing includes well known terminal affixing mechanism. As the conveyor grippers 20 are moved intermittently a terminal applying and affixed mechanism (not shown) is utilized to apply the desired type and size of electrical terminal to the cut and stripped end of the wire 96 which is held in the conveyor gripper. Such affixing of a terminal is timed to occur when the particular conveyor gripper is at rest, namely, when the link chain 286 is not being actuated by the interaction of the barrel cam 296 and the cam plate 292.

In operation, the feed wheel 12 pushes wire 96 to be processed through the guide assembly 14. Movable guide tube 102 is extended and the entire guide assembly 14 has been elevated by virtue of the interaction of the sector cam 108 upon roller 110.

As wire 96 is being pushed through the guide assembly 14, both guide tubes 100 and 102 drop down at a predetermined time immediately behind the conveyor gripper 20 which is at that time in the open position. The dropping down of the guide tubes occurs because the sector cam 108 has rotated past its position of contact with the roller 110.

The crank rod 138 then causes reciprocating carriage 140 to advance rearwardly thereby retracting the guide tubes. Meanwhile, the wire 96 is still being pushed through the guide tubes and is still being laid into and passing through the conveyor gripper 20.

The trunnion assembly 84 now becomes effective, such that the bevel gear 66 is being rocked in the same sense as the gear 54, so that the feed wheel 12 begins to slow down.

The barrel cam 164 through the medium of the lever 170 actuates the rods 188 and 190 in order to cause the cutting and stripping knives 16 to start to close. Simultaneously, the second finger 194 is also actuated by means of the barrel cam 164 in order to rotate the rod assembly 214 thereby causing the stripper gripper 18 to begin to close about the upstream end of a downstream piece of wire.

The rocking of the trunnion assembly 84 has now caused the feed wheel to become essentially stationary and thus the wire 96 is no longer being pushed past the cutting and stripping zone.

The cutting and stripping knives are now fully closed and the downstream wire is fully gripped by stripper gripper 18.

The trunnion assembly 84 now causes the feed wheel 12 to reverse to strip the downstream end of the upstream wire. Simultaneously, the link 238 actuates the carriage 216 to cause the stripper gripper 18 to advance thereby stripping the upstream end of the downstream wire.

Near the end of the advance of the stripper gripper 18, the actuator rod 244 secured to carriage 216 contacts slidable rod 250 which causes the cam 260 to be pivoted away from the roller 266. This causes the roller 266 to pivot immediately upwardly thereby causing the conveyor gripper 20 to immediately close. It is to be noted that the rod assembly 214 has caused the stripper gripper 18 to open after the cam 260 has moved away to permit the conveyor gripper 20 to close. Thus, the cut and stripped length of wire is transferred from the stripper gripper 18 to the conveyor gripper 20.

As the conveyor gripper 20 closes, the following happens:

(a) The conveyor gripper 20 is moved a fixed distance toward the terminal affixing station by virtue of the action of the cam 296 upon a roller 294 of the cam plate 292. Thereafter, a terminal is secured to one of the ends of the wire by well known terminal affixing means at a time when the conveyor grippers are at rest.

(b) The guide assembly 14 is now elevated and extended under the respective actions of the sector cam 108 and the carriage 140. In extending the guide assembly, the movable guide tube 102 slides over stationary tube 100 and passes over the cutting and stripping knives.

(c) The cutting and stripping knives 16 then begin to open.

(d) The feed wheel 12 now is permitted by the trunnion assembly to rotate wire 96 forwardly through the guide assembly 14.

(e) The opened stripper gripper 18 then begins to move rearwardly under the backward urging of the link 238.

It is thus seen that the cycle is now about to repeat itself.

With the present invention the wire to be processed is led over the cutting and stripping zone under the action of the guide assembly 14. The wire is then laid so that it passes through the conveyor gripper 20 until such time as the stripper gripper 18 is about to close. This is accomplished by virtue of the dropping action of the guide assembly 114. In this way, the wire is precisely laid in the conveyor gripper and thus there is no danger that the wire may be shot to one side of the conveyor gripper as it well might be under conditions of high speed without the presence of the guide assembly of the present invention.

In addition, the telescoping guide assembly 14 moves up and over the cutting and stripping knives and in this way guides the wire into precise cutting position when the guide assembly drops down with continued movement of the sector cam 108.

It is to be further understood that the stripping knives of the present invention merely cut through the insulation but do not cut the conductor. The stripping knives remain in contact with the insulation so that when the feed wheel reverses or when the stripper gripper advances, the insulation between the cut conductor and the cut insulation is fully severed.

Another embodiment of the present invention is shown at 400 in FIGS. 9 to 23 of the present invention. This embodiment 400 of the present invention as generally shown in FIG. 10 is similar in many respects to the first embodiment of the present invention, and thus the same reference numerals have been used wherever possible.

The embodiment 400 differs from the first embodiment of the present invention mainly in providing a feeder gripper 402 upstream of cutting and stripping knives 16, and will assume one of two positions as indicated by a comparison of FIGS. 10 and 11 for reasons that will be discussed hereinafter. By virtue of the provision of feeder gripper 402, the cutting and stripping knives 16 can be described in embodiment 400 as being interposed between feeder gripper 402 and stripper gripper 18.

By virtue of the introduction of feeder gripper 402, embodiment 400 of the present invention will not only cut and strip both ends of a piece of wire, but will also affix a terminal to both ends of the wire.

Figure 10:
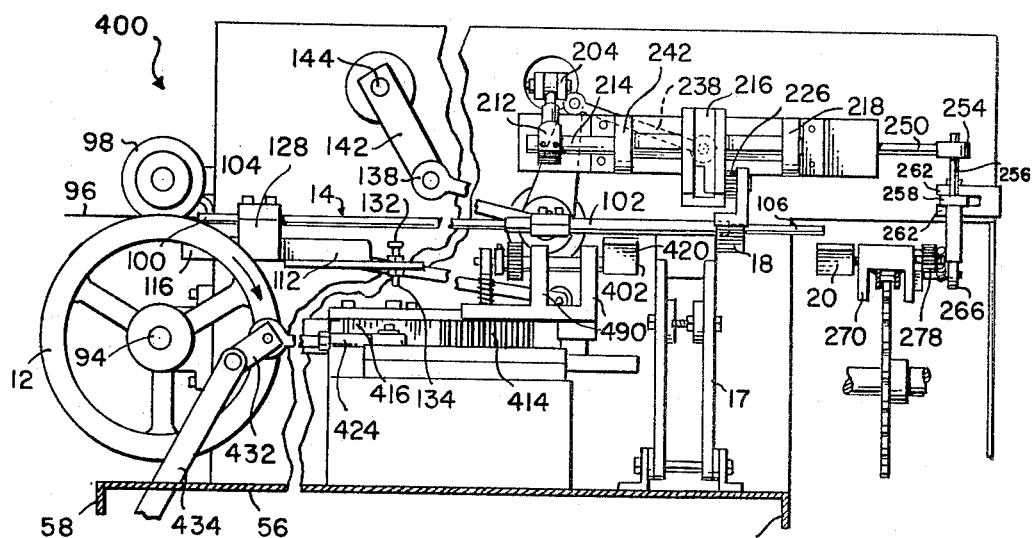
FIG. 10 is a view similar to FIG. 2.
Figure 11:
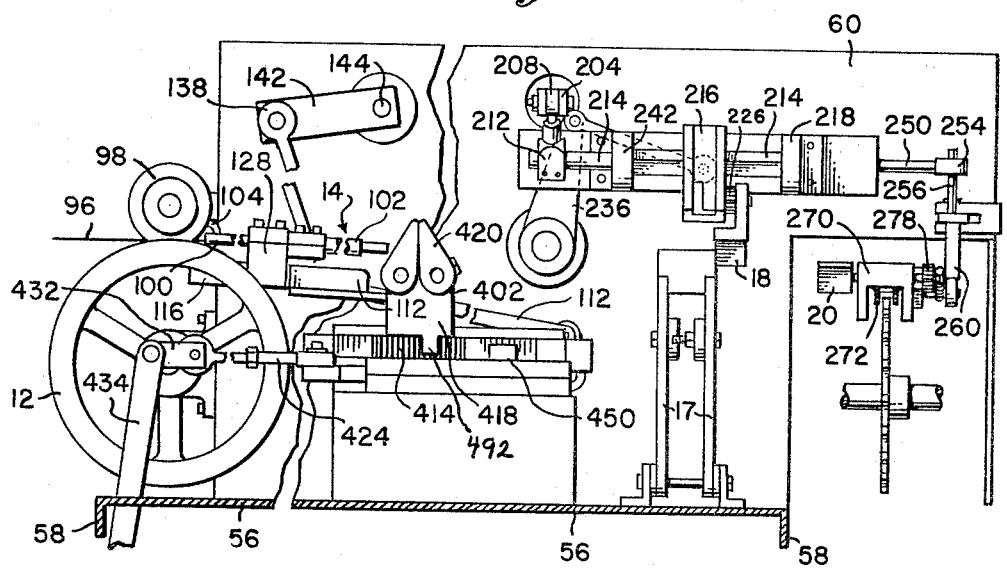
FIG. 11 is a view similar to FIG. 5.
Figure 12:
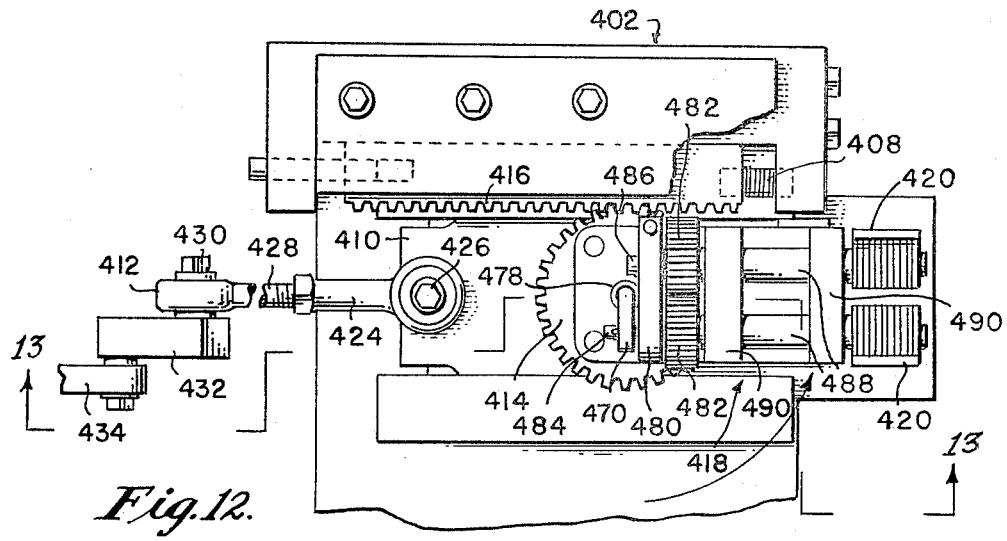
FIG. 12 is an enlarged plan view of the feeder gripper.
Figure 16:
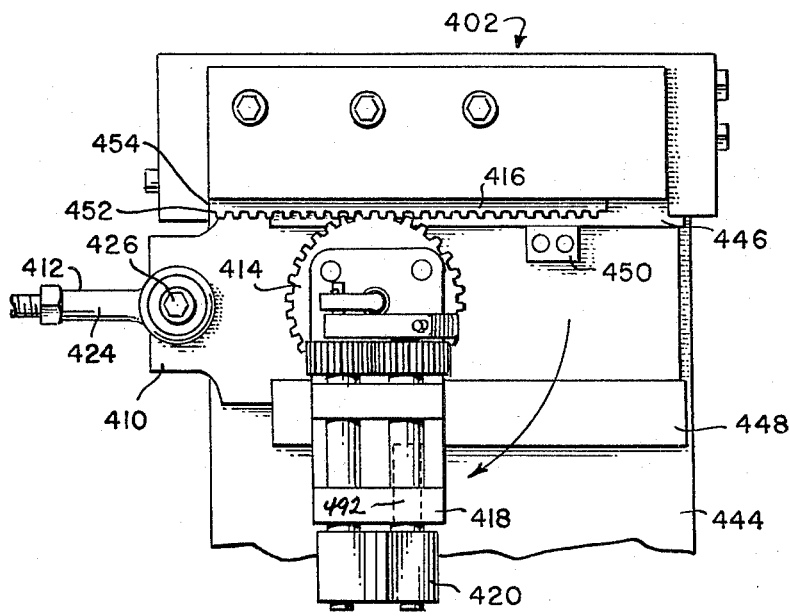
FIG. 16 is a view similar to FIG. 12 but wherein the feeder gripper has retracted linearly with the carriage thereof now pivoted toward a terminal affixing station with the feeder gripper fingers in the closed position.

The feeder gripper 402 will generally be either in the open axial position of FIGS. 12 or 10, or in the closed pivoted terminal affixing position of FIG. 16 or FIG. 11.

By virtue of the introduction of the feeder gripper 402, there will be some modification of certain functions of the first embodiment of the present invention. The second embodiment 400 of the present invention operates in accordance with the following cycle:

(1) The feed wheel 12 pushes wire 96 to be processed through guide assembly 14 including rear stationary tube 100 and forward movable tube 102. The entire guide assembly 14 has been elevated by virtue of the interaction of sector cam 108 upon roller 110.

(2) As shown in FIG. 19 insulated wire 96 has already had a terminal 404 affixed to the downstream bared end thereof for reasons which will appear hereinafter.

(3) At this stage of the cycle feeder gripper 402 is open as well as cutting and stripping knives 16, stripper gripper 18 and conveyor gripper 20. Thus, the extended and elevated guide assembly 14 is positioned immediately above the aforesaid grippers 402, 18 and 20 and the cutting and stripping knives 16 as shown in FIG. 10. The feeder gripper 402 is in the open extended axial position of FIG. 12.

(4) A predetermined length of wire 96 is therefore pushed through the guide assembly 14 and through and beyond conveyor gripper 20.

(5) The guide tubes 100 and 102 drop down at a predetermined time as in the first embodiment of the present invention behind conveyor gripper 20 which is still in the open position.

(6) The guide assembly 14 is now retracted as in the first embodiment of the present invention, but wire 96 is still being pushed forwardly through the guide tubes. The guide assembly 14 retracts for a considerable distance to a position upstream of feeder gripper 402 to the position of FIG. 20.

(7) The feeding wheel 12 begins to slow down as in the first embodiment, but wire 96 is still being fed forwardly at a decelerating rate through the now retracted guide assembly 14.

(8) With the wire 96 still being pushed forwardly at a decelerating rate, feeder gripper 402 closes, cutting and stripping knives 16 close and the stripper gripper 18 closes to reach the condition shown in FIG. 20. Since the wire 96 is still being pushed forwardly, a small loop of wire 406 begins to develop immediately behind feeder gripper 402.

(9) With the wire 96 now being pushed forwardly at a very slow rate, the stripper gripper 18 advances to strip the upstream end of the downstream wire. At the same time, the feeder gripper 402 retracts axially or linearly to strip the downstream end of the upstream wire.

(10) The feeder gripper 402 now continues to retract and pivots concurrently to the terminal affixing position of FIG. 21 or FIG. 16 so that a terminal 404 is affixed to the downstream end of the upstream wire. By this time, the wire 96 has become stationary and the feed wheel 12 has reversed to pull some of the wire 96 away from the feeder gripper 402, and thereby tend to minimize the size of the loop 406. As soon as the terminal 404 is affixed to the downstream end of the upstream wire, by mechanism well known to the art, the feeder gripper 402 opens and then pivots back to its axial position and then is advanced linearly and forwardly against the bias of spring 408 substantially to the position of FIG. 12.

(11) When the stripper gripper 18 advanced, it tripped a link as in the first embodiment of the invention in order to close conveyor gripper 20.

(12) When conveyor gripper 20 closed, stripper gripper 18 opened and the following happened:

(a) The conveyor gripper advanced as in the first embodiment of the present invention toward a terminal affixing station in order to place a terminal on the upstream end of the downstream wire. (The downstream end already has a terminal affixed thereto by the action of the feeder gripper in a previous cycle.)

(b) With the feeder gripper 402 now open, the guide tube 14 is now also elevated and extended, with the guide tube passing over cutting and stripping knives before they open.

(c) The cutting and stripping knives 16 then start to open.

(d) The feed wheel 12 begins to feed wire forwardly through the guide tube.

(e) The stripper gripper 18 which is now open begins to return to its initial rearward position.

The details of the feeder gripper 402 are best shown in FIGS. 12 to 18. The feeder gripper 402 basically comprises a slidable plate 410 which is reciprocated by linkage 412, with the plate 410 carrying a main gear 414. The gear 414 meshes with slidable rack 416, and a pivotable and axial moveable carriage 418 is mounted upon the main gear 414. Extending from the carriage 418 are the fingers 420 of the feeder gripper which grasp the wire 96 to be processed. The fingers 420 are opened and closed under the action of air cylinder 422.

Figure 23:
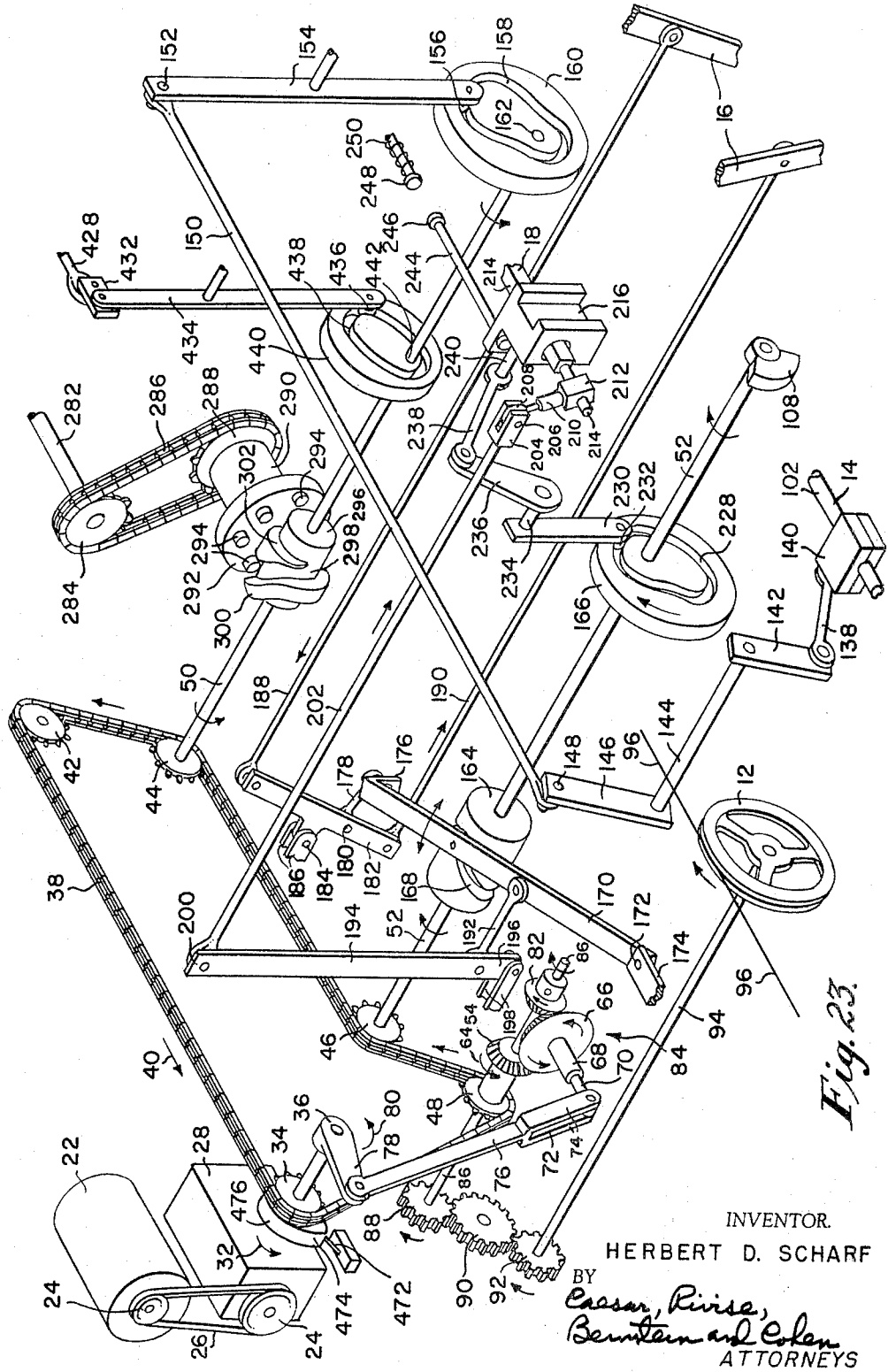
FIG. 23 is a view similar to FIG. 8.

As indicated by a comparison of FIGS. 12 and 16, the plate 410 undergoes linear movement back and forth under the action of the linkage 412 which includes coupling 424 which is secured to plate 410 about stud 426 projecting upwardly therefrom. The other end of the coupling 424 has a threaded socket which receives second coupling 428 that is secured about stud 430 extending from linkage 432 which in turn is connected to actuating rod 434. As shown in FIG. 23, the actuating rod 434 is of considerable length, with the other end thereof having a roller or cam follower 436 secured at its lower end. The cam follower 436 is positioned within cam pattern 438 of this cam 440 that is eccentrically secured to the shaft 50 at 442. It is thus seen that the disc cam 440 rotates in an eccentric manner in accordance with the cam pattern 438 in order to exert a reciprocating action upon actuating rod 434 which in turn is communicated through linkage 432 and couplings 424 and 428 to the plate 410 in order to cause the sliding thereof.

The main gear 414 is carried along with the plate 410 as it slides back and forth, however the main gear 14 will revolve on its own axis in meshing relationship with the slidable rack 416. Therefore, there is relative angular rotation and relative linear movement between revolving main gear 414 and slidable plate 410 as the main gear 414 is carried along with the slidable plate 410. As best shown in FIG. 16, the plate 410 will slide in slots defined by base 444 and fingers 446 and 448.

The rack 416 is normally urged by spring 408 in the direction of linkage 412. However, when the linkage 412 urges the plate 410 toward the front end of apparatus 400 in the manner as shown in FIG. 12, the carriage 418 is returning to its axial position as will be described herein after contacts stop member 450. Further forward sliding of plate 410 under the action of the linkage 412 will now be conveyed to the rack 416 since the stop member 450 prevents further pivoting movement of carriage 418. Therefore when the linkage 412 now urges the plate 410 still further forwardly, the meshing of the gear 414 with the rack 416, causes the rack 416 to be carried forwardly along with plate 410 for a short distance against the bias of spring 408 as the gear 414 and carriage 418 are moved forwardly under the action of linkage 412. When the linkage 412 moves rearwardly, a reversal of the previously described action occurs so that both rack 416 and carriage 418 are retracted in a linear sense for a short distance sufficient to achieve the stripping action of the feeder gripper 402 as previously described.

Further retraction of plate 410 now permits the carriage 418 to pivot as shown in FIG. 16, once the rack 416 has bottomed or has fully moved away from coil spring 418 in such a manner that the rear end 452 of the rack 416 is seated against frame 454 so that gear 414 may now revolve.

Figure 13:
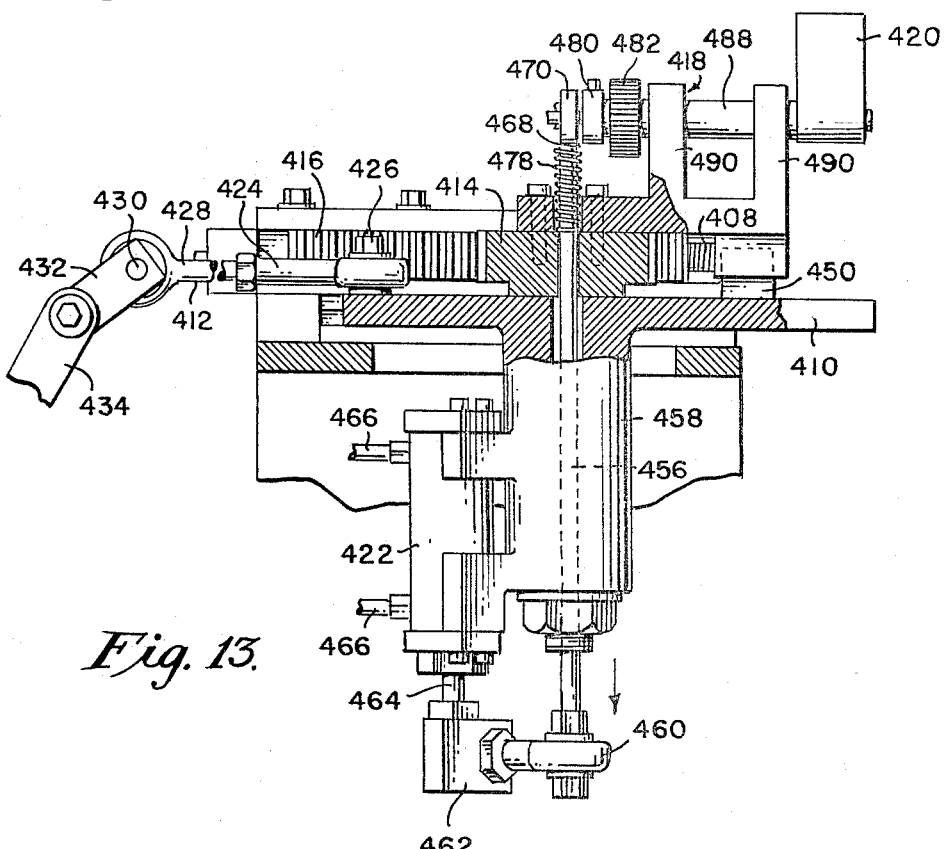
FIG. 13 is a sectional view taken along the lines 13–13 of FIG. 12.
Figure 14:
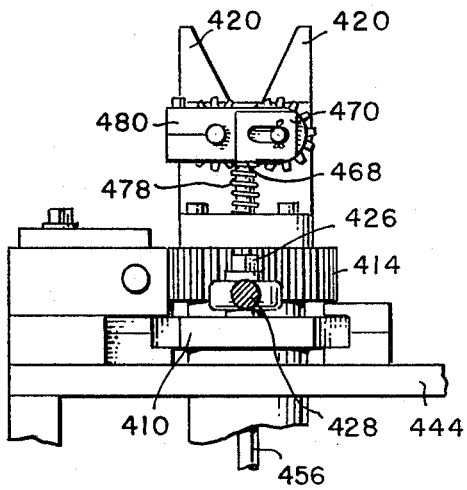
FIG. 14 is an end elevational view, looking forwardly, on a reduced scale of the feeder gripper of FIG. 12.
Figure 15:
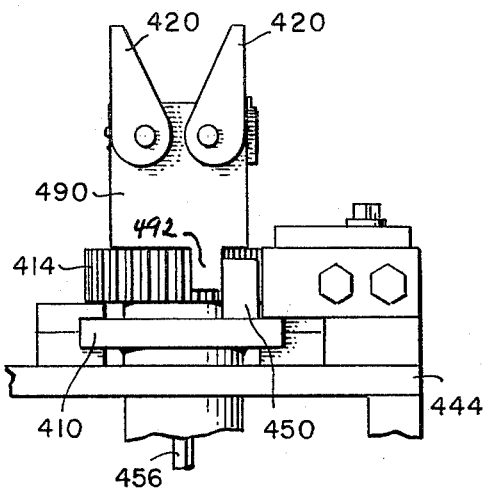
FIG. 15 is a view similar ot FIG. 14, but looking rearwardly.

As shown in FIG. 13 elongated rod 456 extends from the carriage 418 through gear 414, downwardly through bearing housing 458. The lower end of the rod 456 is secured by couplings 460 and 462 to plunger 464 of air cylinder 422 which is actuated through air supply hoses 466. The upper end 468 of rod 456 is secured as shown in FIGS. 14 and 17 to finger control link 470. The rod 456 undergoes an up and down movement independently of plate 410 in response to the action of air cylinder 422 in order to open or close fingers 420 of feeder gripper 402 at a predetermined time.

As previously discussed, the feeder gripper 402 closes at the same time the stripper gripper 18 closes. The air cylinder 422 is actuated by the closing of microswitch 472 through contact by nose 474 of cam 476 which is driven by direct connection to the gear box 28 as shown in FIG. 23.

The downward movement of the rod 456 is achieved against the bias of spring 478 which is interposed between finger control 470 and the top of main gear 414.

It is thus seen that upon a stroke of air cylinder 422, the plunger 464 thereof is forced downwardly which in turn through couplings 460 and 462 carries rod 456 downwardly. This has the effect of closing fingers 420 of feeder gripper 402 as best shown in FIG. 17.

The opening and closing action of the fingers 420 is achieved through the interaction of finger control 470 and link 480 which have the effect of driving gears 482. This construction is best shown in FIGS. 12 and 17 wherein the finger control 470 is secured to one end of link 480 by stud 484. The other end of the link 480 is secured to one of the gears 482 by stud 486.

It is therefore seen that downward movement of the rod 456 carries finger control downwardly. This in turn causes link 480 to be pivoted in a clockwise sense about the stud 486 as shown in FIG. 17. Since the stud 486 is also secured to one of the gears 482 as shown in FIG. 12, this has the effect of driving the one gear 482, and since the other gear 482 meshes with it, the downward movement of rod 456 as caused by air cylinder 422 has the effect of driving the gears 482.

As shown in FIG. 12 the driving action of the gears 482 is conveyed through shafts 488 to the fingers 420 which may be suitably spring biased against each other or away from each other as desired. The shafts 488 are journalled in suitable bearings in supports 490 as shown in FIG. 13.

In operation the feeder gripper is initially in the position of FIG. 12 wherein the rack 416 is urged forwardly against the bias of spring 408 with the fingers 420 of the feeder gripper open. Wire 96 is fed through guide assembly 14 which is elevated and extended. After the guide assembly 14 has dropped down and has been withdrawn to the position of FIG. 11, but with the wire 96 still being fed forwardly across the open feeder gripper 402 and open stripper gripper 18, a time is reached where both the feeder gripper 402 and stripper gripper 18 close upon the wire 96 which is still being forwardly fed at a decelerating rate so that the condition of FIG. 20 is achieved, and a small loop 406 is built up.

When the cutting and stripping knives 16 close, the stripper gripper 18 advances forwardly to strip the upstream end of the downstream wire. Simultaneously linkage 412 begins to exert a pull upon the plate 410 in order to move carriage 418 linearly and rearwardly.

The closing of the fingers 420 of feeder gripper 402 occurred through the action of air cylinder 422 at a desired time in accordance with the action of cam 476 upon microswitch 472. The linkage 412 exerts a rearward pull upon the plate 410 in accordance with the cam pattern 438 in disc cam 440 which urges actuating rod 434 rearwardly in order to obtain the desired movement of the plate 410.

As the plate 410 is slid rearwardly, the carriage 418 will move linearly with it for a short distance until the rack 416 has moved away from spring 408 a sufficient distance that rear end 452 thereof abuts or bottoms against frame 454. As the plate 410 is retracted in further linear movement, the main gear 414 will revolve about its axis in meshing relationship with rack 416 which is now bottomed as previously described.

Figure 22:
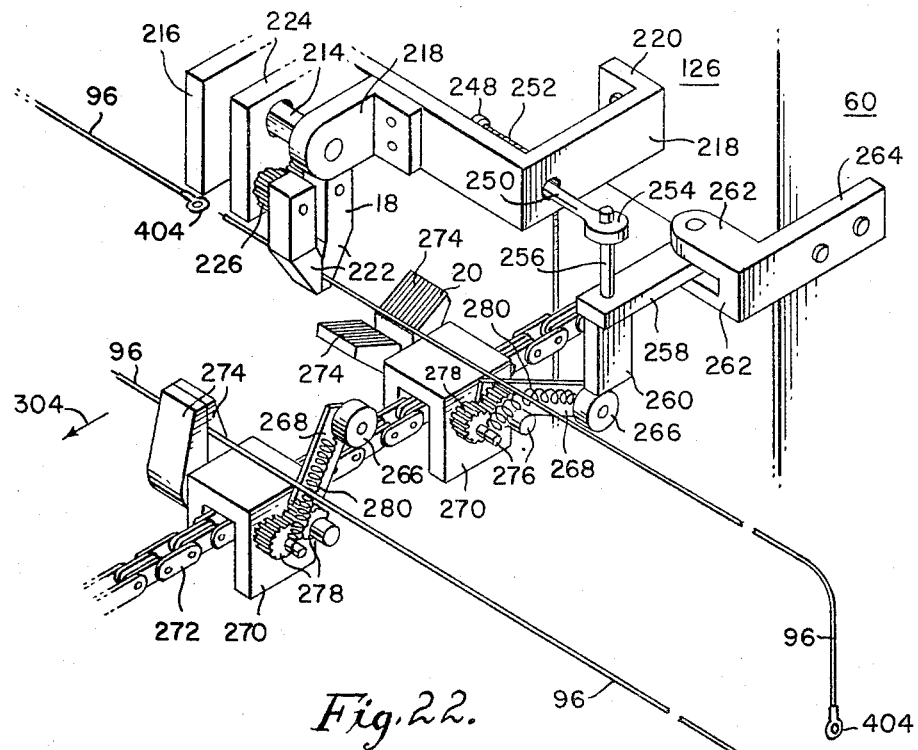
FIG. 22 is a view similar to FIG. 7
Figure 9:
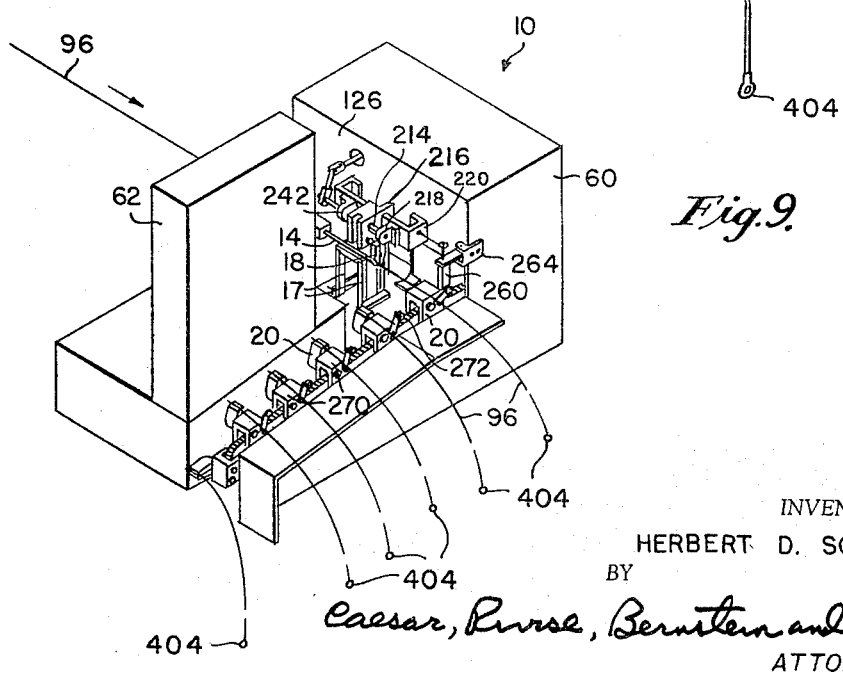
FIG. 9 is a view of a second embodiment of the present invention, similar to FIG. 1.

As the gear 414 revolves with sliding movement of plate 410, the carriage 418 is caused to pivot outwardly in a clockwise sense as shown by the arrow in FIG. 16. During the previously described linear movement of carriage 418, the feeder gripper 402 exerts its stripping action upon the downstream end of the upstream wire which is then carried along with the pivoting action of carriage 418. In this manner, the downstream end of the upstream wire is presented to a terminal affixing station (not shown) in order that the terminal 404 may be secured thereto as shown in FIG. 22.

When the pivoting of the carriage 418 began, the wire 96 was still being fed forwardly at a very slow and diminishing rate so that there was some tolerable buildup in wire loop 406. However, when the carriage 418 has pivoted to the position of FIG. 16, the wire 96 has reversed its direction of travel, and this has the effect of diminishing the size of the loop 406.

After the terminal 404 has been affixed to the wire 96, the cam 476 will again strike microswitch 472 and cause air cylinder 422 to operate and exert an upward action upon rod 456 so that the fingers 420 of the feeder gripper open.

As previously discussed, the guide tube 14 is now elevated and is travelling forwardly again as the rearward movement of linkage 412 ceases, and the linkage 412 now urges plate 410 forwardly under the action of cam 440 upon rod 434 as previously described. As soon as the plate 410 begins to move forwardly, the carriage 418 will begin to pivot in a counterclockwise sense because of the meshing of gear 414 in the now stationary rack 416. This will occur until the pivoting carriage 418 strikes stop member 450, and so the carriage 418 can pivot no longer. If desired a stop member 492 may also be formed in carriage 418. From now on, any further forward movement of plate 410 will have the effect of carrying along rack 416 with it against the bias of spring 408 because of the abutment against stop member 450. Therefore the carriage 418 returns to the position of FIG. 12 in order that the cycle may start again.

It is to be noted that when the carriage 410 retracts, that it necessarily carries with it the rod 456 in linear movement. However, it is preferred for efficient design that the air cylinder 422 move along with housing 458. Relative movement such as pivoting between air cylinder 422 and housing 458 is achieved through coupling 462 which may pivot with respect to plunger 464 so that linear movement of the rod 456 proceeds as the coupling 462 pivots about plunger 464.

In embodiment 400 of the present invention, it is preferred in a particular cycle of operation that there be a forward feed of the wire 96 for a 250° period and a reversal of feed for a 110° period. In other words, the time of forward feed should be more than twice the time of reversal.

By virtue of the foregoing operation of embodiment 400, it is to be observed that the carriage 418 undergoes an axial movement rearwardly to strip the downstream end of the upstream wire, and then the carriage 418 undergoes a pivoting action in order to bring the downstream end of the upstream wire to a terminal affixing station. However, as the carriage 418 pivots, it will also be undergoing axial or linear movement since the carriage 418 will be carried along with the rearward movement of the plate 410.

It is thus seen that both embodiments of the present invention achieve an accuracy and controllability of wire feed which has been heretofore unattained.

It is contemplated to have multiple stroking or feeding of wire 96 where unusually long lengths of wire are to be produced. This will occur through a cycling mechanism that may be preset in order to maintain the guide assembly 14 in its forward and extended position to permit the wire 96 to be pushed therethrough for a predetermined number of cycles, before the guide assembly will drop down and retract in order that the terminal affixing operations may take place.

It is thus seen that in the first embodiment of the present invention a length of wire is produced with both ends being stripped, and a terminal is affixed to the upstream end thereof. In the second embodiment of the invention, terminals are affixed to both ends of the wire.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A wire processing and terminal affixing machine comprising reciprocable guide means, a power source, feed means connected to said source for pushing a predetermined length of wire from a supply through said guide means and past a wire severing and insulation stripping station when said guide means are extended past said station, means connected to said source for severing the desired lengths of wire, the severed length of wire being designated the downstream wire and the wire still connected to the supply being designated the upstream wire, said reciprocable guide means being retractable behind said wire severing and insulation stripping station prior to actuation of said severing and stripping station, means for moving said severing means away from said wire after it has been severed, means connected to said source for cutting the insulation on the severed end of both the downstream and upstream wires, stripper gripper means connected to said source for advancing the downstream wire to pull the insulation off its severed end and to deposit the downstream wire in conveyor gripper means which transfer the cut and stripper downstream wire toward a terminal affixing station.

2. The invention of claim 1 wherein trunnion means are provided to reverse said feed means to retract the upstream wire subsequent to actuating said severing and insulation cutting means.

3. The invention of claim 2 wherein the reversal of said feed means occurs simultaneously with the advance of said downstream wire to strip simultaneously the upstream end of the downstream wire and the downstream end of the upstream wire.

4. The invention of claim 1 wherein said feed means comprises a feed wheel adapted to advance said wire by rotation of said feed wheel, and means connected to said source for rotating said wheel a predetermined amount in accordance with the desired length of wire to be advanced.

5. The invention of claim 1 wehrein said feed means comprises a feed wheel adapted to advance said wire by the rotation of said feed wheel, means connected to said source for rotating said wheel a predetermined amount in accordance with the desired length of wire to be advanced, and trunnion means connected to said source for reversing the rotation of said feed wheel in order to retract said wire after it has been severed to strip said insulation.

6. The invention of claim 1 wherein said conveyor gripper means are in the open position during the feeding of said wire by said feed means and during the stripping of said wire by said stripper gripper means.

7. The invention of claim 6 wherein said reciprocable guide means comprises a rear stationary tube, and a forward movable tube in slidable telescopic relationship with respect to said stationary tube.

8. The invention of claim 7 wherein a reciprocable carriage is associated with said forward movable tube.

9. The invention of claim 8 including an extension secured to said forward movable tube and projecting forwardly therefrom so as to be positioned adjacent said conveyor gripper in a forward position of said reciprocable guide means.

10. The invention of claim 9 wherein said reciprocable guide means are pivotally mounted so as to be sequentially raised and lowered whereby said reciprocable guide means may be elevated and extended, may drop down in the extended position and then may be retracted behind the severing and insulation stripping station during the feeding of wire through said reciprocable guide means with said wire being precisely laid in said conveyor gripper means.

11. The invention of claim 1 including a shaft connected to said power source, first and second cam means secured to said shaft to rotate therewith, both of said cam means having a cam pattern formed therein, said first cam means actuating said cutting and stripping means.

12. The invention of claim 11 including a lever adapted to be pivoted by said first cam means, said cutting and stripping means being actuated by the pivoting of said lever, a rod associated with said lever and operatively connected to a rod assembly passing through a reciprocable stripping gripper carriage whereby said first cam means actuates said rod to cause said rod assembly to open and close said stripper gripper means.

13. The invention of claim 12 including linkage associated with said second cam means to reciprocate said stripper gripper carriage with said rod assembly being a guide for said stripper gripper carriage.

14. The invention of claim 13 including an actuator rod on said stripper gripper carriage to urge third cam means to release a biased lever associated with said conveyor gripper means thereby closing said conveyor gripper means.

15. The invention of claim 8 wherein said conveyor gripper means are intermittently moved toward said terminal affixing station by cam means responsive at the same time by means which actuate the reciprocation of the carriage associated with said forward movable tube.

16. The invention of claim 1 including feeder gripper means positioned upstream of said wire severing and insulation station, said feeder gripper being adapted to retract axially to strip the insulation from the downstream end of the upstream wire substantially simultaneously with the action of said stripper gripper means.

17. The invention of claim 16 wherein said feeder gripper means pivot toward a terminal affixing station upon completion of the axial stripping action.

18. The invention of claim 17 wherein said feeder gripper means are open during the feeding of said wire and closed about the same time as said stripper gripper closes.

19. The invention of claim 18 wherein said feeder gripper includes a slidable plate which is reciprocated by linkage, said plate carrying a main gear, said gear meshing with a rack that is stationary, but which is slidable for a short distance under the urging of said linkage when rotation of said gear is restrained, a pivotable and axially movable carriage mounted on said gear, feeder gripper fingers extending from said carriage and rotation of said gear being restrained when said carriage is returned from a terminal affixing station to its axial position.

20. In a wire processing and terminal affixing machine including feeding means for pushing wire past a cutting and stripping station, the improvement comprising providing reciprocable guide means including a rear station tube, and a forward movable tube in slidable telescopic relationship with respect to said stationary tube, said wire being pushed through said guide means when said guide means are extended past said cutting and stripping station, said guide means being retracted behind said cutting and stripping station prior to the actuation of said cutting and stripping station, said wire being laid into conveyor gripper means when said guide means are extended.

21. The invention of claim 20 wherein a reciprocable carriage is associated with said forward movable tube.

22. The invention of claim 21 including an extension secured to said forward movable tube and projecting forwardly therefrom so as to be positioned adjacent a conveyor gripper in a forward position of said reciprocable guide means.

23. The invention of claim 22 wherein said reciprocable guide means are pivotally mounted so as to be sequentially raised and lowered whereby said reciprocable guide means may be elevated and extended, may drop down in the extended position and then may be retracted behind the cutting and insulation stripping station during the feeding of wire through said reciprocable guide means with said wire being precisely laid in said conveyor gripper means.

24. A wire processing and terminal affixing machine comprising reciprocable guide means, a power source, feed means connected to said source for pushing a predetermined length of wire from a supply through said guide means and past a wire severing and insulation stripping station, means connected to said source for severing the desired lengths of wire, the severed length of wire being designated the downstream wire and the wire still connected to the supply being designated the upstream wire, said reciprocable guide means being retractable behind said wire severing and insulation stripping station, means for moving said severing means away from said wire after it has been severed, means connected to said source for cutting the insulation on the severed end of both the downstream and upstream wires, stripper gripper means connected to said source for advancing the downstream wire to pull the insulation off its severed end and to deposit the downstream wire in conveyor gripper means which transfer the cut and stripped downstream wire toward a terminal affixing station, trunnion means adapted to reverse said feed means to retract the upstream wire subsequent to actuating said severing and insultion cutting means, the reversal of said feed means occurring simultaneously with the advance of said downstream wire.

25. A wire processing and terminal affixing machine comprising reciprocable guide means, a power source, feed means connected to said source for pushing a predetermined length of wire from a supply through said guide means and past a wire severing and insulation stripping station, means connected to said source for severing the desired lengths of wire, the severed length of wire being designated the downstream wire and the wire still connected to the supply being designated the upstream wire, said reciprocable guide means being retractable behind said wire severing and insulation stripping station, means for moving said severing means away from said wire after it has been severed, means connected to said source for cutting the insulation on the severed end of both the downstream and upstream wire, stripper gripper means connected to said source for advancing the downstream wire to pull the insulation off its severed end and to deposit the downstream wire in conveyor gripper means which transfer the cut and stripped downstream wire toward a terminal affixing station, a shaft connected to said power source, first and second cam means secured to said shaft to rotate therewith, both of said cam means having a cam pattern formed therein, said first cam means actuating said cutting and stripping means, a lever adapted to be pivoted by said first cam means, said cutting and stripping means being actuated by the pivoting of said lever, a rod associated with said lever and operatively connected to a rod assembly passing through a reciprocable stripper gripper carriage whereby said first cam means actuates said rod to cause said rod assembly to open and close said stripper gripper means.

26. The invention of claim 25 including linkage associated with said second cam means to reciprocate said stripper gripper carriage with said rod assembly being a guide for said stripper gripper carriage.

27. The invention of claim 26 including an actuator rod on a stripper gripper carriage to urge third cam means to release a biased lever associated with said conveyor gripper means thereby closing said conveyor gripper means.

28. The invention of claim 27 wherein said conveyor gripper means are intermittently moved toward said terminal affixing station by cam means responsive at the same time by means which actuate the reciprocation of the carriage associated with said forward movable tube.

29. A wire processing machine comprising reciprocable guide means, a power source, feed means connected to said source for pushing a predetermined length of wire from a supply through said guide means and past a wire severing and insulation stripping station, means connected to said source for severing the desired lengths of wire, the severed length of wire being designated the downstream wire and the wire still connected to the supply being designated the upstream wire, said reciprocable guide means being retractable behind said wire severing and insulation stripping station, means for moving said severing means away from said wire after it has been severed, means connected to said source for cutting the insulation on the severed end of both the downstream and upstream wires, stripper gripper means connected to said source for advancing the downstream wire to pull the insulation off its severed end, said wire being laid into conveyor gripper means when said guide means are extended.

30. The invention of claim 29 including said conveyor gripper means in the open position during the feeding of said wire by said feed means and during the stripping of said wire by said stripper gripper means.

31. The invention of claim 30 wherein said reciprocable guide means comprises a rear stationary tube, and a forward movable tube in slidable telescopic relationship with respect to said stationary tube.

32. The invention of claim 31 wherein a reciprocable carriage is associated with said forward movable tube.

33. The invention of claim 32 including an extension secured to said forward movable tube and projecting forwardly therefrom so as to be positioned adjacent said conveyor gripper in a forward position of said reciprocable guide means.

34. The invention of claim 30 wherein said reciprocable guide means are pivotally mounted so as to be sequentially raised and lowered whereby said reciprocable guide means may be elevated and extended, may drop down in the extended position and then may be retracted behind the severing and insulation stripping station during the feeding of wire through said reciprocable guide means with said wire being precisely laid in said conveyor gripper means.

35. The invention of claim 1 wherein said guide means is elevated and extended past said severing and stripping station during the pushing of said wire to position said wire adjacent said conveyor gripper means, said guide means dropping down and retracting to a position before said severing and stripping station prior to the stopping of said feeding, thereby laying said wire on said conveyor gripper means.

36. The invention of claim 20 including feeder gripper means positioned upstream of said wire severing and insulation station, said feeder gripper being adapted to retract axially to strip the insulation from the downstream end of the upstream wire substantially simultaneously with the action of said stripper gripper means.

37. The invention of claim 36 wherein said feeder gripper means pivot toward a terminal affixing station upon completion of the axial stripping action.

38. The invention of claim 37 wherein said feeder gripper means are open during the feeding of said wire and closed at about the same time as said stripped gripper closes.

39. The invention of claim 38 wherein said feeder gripper includes a slidable plate which is reciprocated by linkage, said plate carrying a main gear, said gear meshing with a rack that is stationary, but which is slidable for a short distance under the urging of said linkage when rotation of said gear is restrained, a pivotable and axially movable carriage mounted on said gear, feeder gripper fingers extending from said carriage and rotation of said gear being restrained when said carriage is returned from the terminal affixing station to its axial position.

40. In a wire processing and terminal affixing machine including feeding means for pushing wire past a cutting and stripping station, the improvement comprising providing reciprocable guide means including a rear stationary tube, and a forward movable tube in slidable telescopic relationship with respect to said stationary tube, said wire being pushed through said guide means when said guide means are extended past said cutting and stripping station, said guide means being retracted behind said cutting and stripping station prior to the actuation of said cutting and stripping station.

41. A wire processing machine comprising reciprocable guide means, a power source, feed means connected to said source for pushing a predetermined length of wire from a supply through said guide means and past a wire severing and insulation stripping station, means connected to said source for severing the desired lentghs of wire, the severed length of wire being designated the downstream wire and the wire still connected to the supply being designated the upstream wire, said reciprocable guide means being retractable behind said wire severing and insulation stripping station, means for moving said severing means away from said wire after it has been severed, means connected to said source for cutting the insulation on the severed end of both the downstream and upstream wires, stripper gripper means connected to said source for advancing the downstream wire to pull the insulation off its severed end.

42. A method of processing wire comprising providing a cutting and stripping station, moving said wire over and beyond said cutting and stripping station, severing said wire at a point, the severed length of wire being designated the downstream wire and the remainder of the wire being designated the upstream wire, cutting the insulation upstream and downstream of said point and stripping away the insulation lying between said point and said upstream and downstream cuts by exerting opposed axial and linear pulls on said wire including an upstream pull on said upstream wire and a downstream pull on said downstream wire and feeding the bared downstream end of said upstream wire to a terminal affixing station, affixing a terminal on said bared end, moving said wire over and beyond said cutting and stripping station and repeating the aforesaid steps to produce a bared upstream end of said upstream wire and moving said bared end toward a terminal affixing station in order to produce a length of wire having terminals affixed to both ends thereof.

References Cited by the Examiner

UNITED STATES PATENTS

| | | | |
|---|---|---|---|
| 1,295,224 | 2/1919 | Smith et al. | 242—80 |
| 2,756,619 | 7/1956 | Scharf | 81—9.51 |
| 2,884,825 | 5/1959 | Eubanks | 81—9.51 |
| 3,029,494 | 4/1962 | Andren | 29—155.55 |
| 3,030,694 | 4/1962 | Kerstetter et al. | 29—155.55 X |

EDWARD C. ALLEN, *Primary Examiner.*

M. S. MEHR, *Assistant Examiner.*